(12) United States Patent
Cheng et al.

(10) Patent No.: US 9,506,721 B2
(45) Date of Patent: Nov. 29, 2016

(54) FIREARM MOUNT WITH SIGHT MODULE

(71) Applicants: Carson Cheng, City of Industry, CA (US); Changan Tian, City of Industry, CA (US)

(72) Inventors: Carson Cheng, City of Industry, CA (US); Changan Tian, City of Industry, CA (US)

(73) Assignee: N cSTAR, Inc., City of Industry, CA (US)

( * ) Notice: Subject to any disclaimer, the term of this patent is extended or adjusted under 35 U.S.C. 154(b) by 343 days.

(21) Appl. No.: 14/188,674

(22) Filed: Feb. 24, 2014

(65) Prior Publication Data

US 2015/0241169 A1    Aug. 27, 2015

(51) Int. Cl.
*F41G 1/34*    (2006.01)
*F41G 1/00*    (2006.01)
*G02B 27/20*   (2006.01)

(52) U.S. Cl.
CPC . *F41G 1/00* (2013.01); *F41G 1/34* (2013.01); *G02B 27/20* (2013.01)

(58) Field of Classification Search
USPC ............................ 42/90, 111, 114, 115, 124
See application file for complete search history.

(56) References Cited

U.S. PATENT DOCUMENTS

| 7,743,547 | B2* | 6/2010 | Houde-Walter | F41G 11/003 362/110 |
| 9,068,801 | B1* | 6/2015 | Stecher, Jr. | F41G 11/00 |
| 2013/0074394 | A1* | 3/2013 | Larue | F41G 1/28 42/111 |
| 2015/0276347 | A1* | 10/2015 | Sharrah | F41G 1/35 42/117 |

* cited by examiner

*Primary Examiner* — J. Woodrow Eldred
(74) *Attorney, Agent, or Firm* — Raymond Y. Chan; David and Raymond Patent Firm (57) ABSTRACT

A firearm mount for a firearm includes a mounting body, a sight module, and a mounting interface. The mounting body has a first mounting face adapted for detachably coupling with the firearm and an opposed second mounting face. The sight module is supported by the mounting body between the first and second mounting faces thereof. The mounting interface is provided at the second mounting face of the mounting body to define a mounting direction aligning with a barrel axis of the firearm.

23 Claims, 8 Drawing Sheets

FIREARM MOUNT WITH SIGHT MODULE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a firearm accessory, and more particular to a firearm mount detachably mounted at a firearm to serve a firearm sight and an accessory adapter for incorporating different firearm accessories.

Description of Related Arts

Sighting device in most firearms applications has been used as a tool to give an accurate aiming point during shooting. For example, a laser sight is one of the common sighting devices placed on a handgun or a rifle, wherein the laser sight generates a visible laser beam aligned to a barrel axis. Especially for small firearms, such as the handgun, the sighting device must be placed on the firearm at a desired location where the sighting device should not block the sight of the shooter. In particular, the weight of the sighting device should not be heavy when the handgun is held. Since the handgun only provides a relatively small attachment surface, the handgun generally cannot incorporate with a plurality of firearm accessories. In other words, when the sighting device is mounted to the handgun, other firearm accessories cannot be mounted to the handgun.

U.S. Pat. No. 7,743,547 and US Pub. No. 2011/0162251 disclose a firearm mount with embedded sight which comprises a beam generator built-in with an adapter body for mounting to a small arm dischargeable device and a device mounting rail profile transverse to a discharge axis of the small arm dischargeable device. In particular, the device mounting rail profile has a dovetail cross sectional area transverse to the discharge axis for engaging an accessory. However, the firearm mount has several drawbacks.

Once the adapter body is mounted to the small arm dischargeable device, the accessory must be mounted to the adapter body at the transverse direction with respect to the discharge axis of the small arm dischargeable device. In other words, the device mounting rail profile will only enable the accessory to be mounted at the adapter body at the transverse direction. It is not ergonomic for a user to hold the handgun and mount the accessory to the adapter in a transverse direction to the discharge axis of the handgun.

In addition, the device mounting rail profile with the dovetail structure will substantially increase the overall weight of the firearm mount. Accordingly, the dovetail rail includes a set of protrusions to define a plurality of recoil grooves that cross the dovetail rail in the direction of the transverse axis. The dovetail rail will not only increases the overall weight of the firearm mount but also increase the manufacturing cost of the firearm mount incorporating with the device mounting rail profile.

Since the beam generator is built-in with the adapter body, a battery compartment must be provided thereat for supplying electrical power to the beam generator. Accordingly, the battery compartment is formed in the mounting rail through the outer land surface. In other words, the battery compartment cover is coupled at the mounting rail to enclose the battery compartment. As a result, the utility area of the mounting rail will be inevitably reduced by the battery compartment cover, such that the accessory may not be secured to the mounting rail with such limited area. Moreover, the battery compartment cover is located at the bottom side of the adapter body without any protection when the adapter body is mounted to the small arm dischargeable device. The battery compartment cover may be accidentally detached from the adapter body by any external force. Once the battery compartment cover is loosened or lost, the battery will be dropped out of the battery compartment, such that the beam generator will not able to function at all.

The firearm mount disclosed that an optical axis of the laser sight is substantially aligned with a longitudinal axis or the mounting rail, but is preferably adjustable for calibrating the laser sight. Additional components can also be included within the housing including control circuitry (not shown) for cycling the laser diode on and off to save power and adjustment features for the collimating lens for aligning the laser sight as desired. However, the firearm mount did not disclose any adjustment device in detail to adjust or calibrate the laser sight. Only mentioned in firearm mount for adjustment is the control circuitry for the collimating lens and for aligning the laser sight.

A need exists for a firearm mount that retains all of its sight-aiming and adapter attributes and while allowing a user to couple an accessory to the mount in an ergonomic manner. It is to the provision of such a firearm mount that the present disclosure is primarily directed.

SUMMARY OF THE PRESENT INVENTION

The invention is advantageous in that it provides a firearm mount which can detachably mount at a firearm to serve a firearm sight and an accessory adapter for incorporating different firearm accessories.

Another advantage of the invention is to provide a firearm mount, which comprises a mounting body having a first mounting face adapted for detachably coupling at the firearm and an opposed second mounting face adapted for detachably coupling with the firearm accessory, wherein a sight module is provided between the first and second mounting faces of the mounting body.

Another advantage of the invention is to provide a firearm mount, wherein the mounting interface provides at the second mounting face of the mounting body to define a mounting direction aligning with a barrel axis of the firearm for allowing a user to couple an accessory to the firearm mount in an ergonomic manner.

Another advantage of the invention is to provide a firearm mount, wherein the battery compartment cover is provided at the first mounting face of the mounting body, such that the battery compartment cover can be secured and hidden when the mounting body is coupled to the firearm.

Another advantage of the invention is to provide a firearm mount, wherein the mounting interface comprises a "Key-Mod" slot at the second mounting face of the mounting body in order to provide a quick attachment between the mounting body and the firearm accessory.

Another advantage of the invention is to provide a firearm mount, which serves as an adapter for converting "Weaver" mounting rail or "Picatinny" mounting rail at the firearm into a "keyMod" interface.

Another advantage of the invention is to provide a firearm mount, wherein the sight module can be a laser sight, navigation lights in different colors, flashlight, or a camera. In particular, the laser sight can be adjusted or calibrated via an adjustment unit at the mounting body.

Another advantage of the invention is to provide a firearm mount, which does not require to alter the original structural design of the mounting structure of the firearm, so as to minimize the manufacturing cost of the mounting structure of the firearm incorporating with the firearm mount.

Another advantage of the invention is to provide a firearm mount, wherein no expensive or complicated structure is required to employ in the present invention in order to achieve the above mentioned objects. Therefore, the present invention successfully provides an economic and efficient solution for providing a secure and reliable configuration for the firearm mount with compact and ergonomic design.

Additional advantages and features of the invention will become apparent from the description which follows, and may be realized by means of the instrumentalities and combinations particular point out in the appended claims.

According to the present invention, the foregoing and other objects and advantages are attained by a firearm mount for a firearm, wherein the firearm includes a mounting body, a sight module, and a mounting interface. The mounting body has a first mounting face adapted for detachably coupling with the firearm and an opposed second mounting face. The sight module is supported by the mounting body between the first and second mounting faces thereof. The mounting interface is provided at the second mounting face of the mounting body to define a mounting direction aligning with a barrel axis of the firearm.

In accordance with another aspect of the invention, the present invention comprises a firearm mount for a firearm, wherein the firearm includes a mounting body, a sight module, a mounting interface, and a power module. The mounting body has a first mounting face adapted for detachably coupling with the firearm and an opposed second mounting face. The sight module is supported by the mounting body between the first and second mounting faces thereof. The mounting interface is provided at the second mounting face of the mounting body. The power module is operatively linked to the sight module, wherein the power module comprises a battery compartment formed at the mounting body and defined a compartment opening at the first mounting face, and a compartment cover detachably coupled on the first mounting face of the mounting body at the compartment opening to enclose the battery compartment, such that the compartment cover is hidden and sandwiched between the mounting body and the firearm when the mounting body is coupled at the firearm.

In accordance with another aspect of the invention, the present invention comprises a firearm mount for a firearm having a mounting arrangement and defining a barrel axis, wherein the firearm includes a mounting body and a mounting interface. The mounting body has a first mounting face adapted for detachably coupling with the mounting arrangement of the firearm and an opposed second mounting face. The mounting interface is provided at the second mounting face of the mounting body to define a mounting direction aligning with the barrel axis of the firearm, wherein the mounting body with the mounting interface serves as an adapter for converting the mounting arrangement into the mounting interface in order to incorporate with a firearm accessory.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
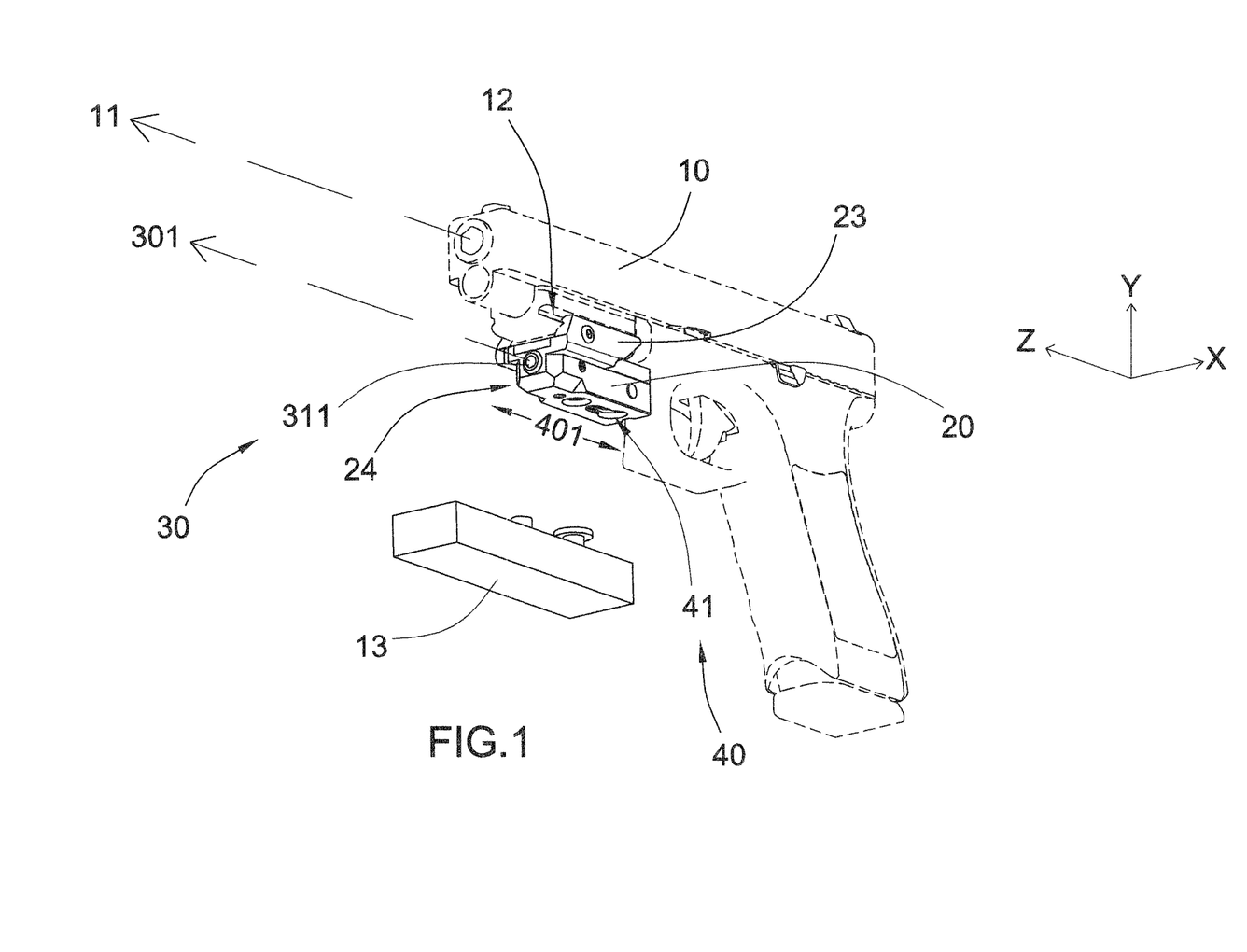
FIG. 1 is a perspective view of a firearm mount according to a preferred embodiment of the present invention, illustrating the firearm mount coupled at a firearm.

Referring to FIGS. 1 to 8 of the drawings, a firearm mount according to the above preferred embodiment of the present invention is illustrated, wherein the firearm mount is adapted for detachably coupling at a firearm 10, especially for a small firearm, such as handgun as illustrated in FIG. 1. Accordingly, the firearm 10 defines a barrel axis 11 and comprises a mounting arrangement 12 for the firearm mount coupling thereat. As shown in FIG. 1, the mounting arrangement 12 can be a "Weaver" mounting rail or a "Picatinny" mounting rail provided at a bottom side of the barrel of the firearm 10.

According to the preferred embodiment, the firearm comprises a mounting body 20, a sight module 30, and a mounting interface 40.

Figure 2:
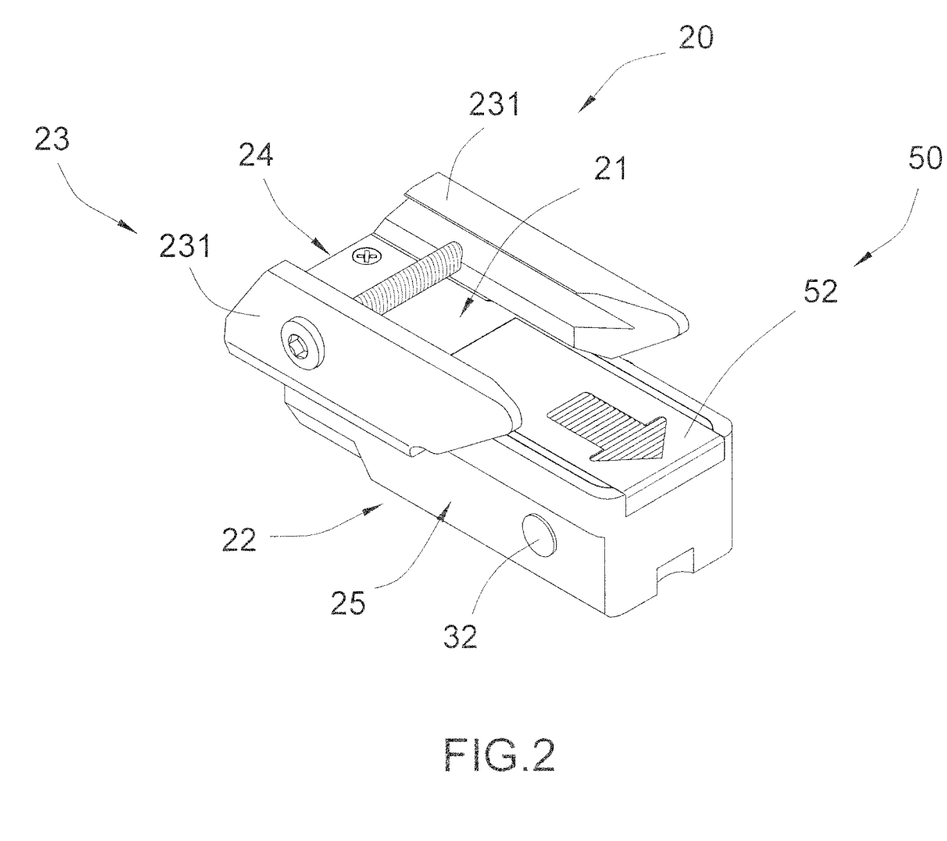
FIG. 2 is a top perspective view of the firearm mount according to the above preferred embodiment of the present invention.

The mounting body 20 has a first mounting face 21 adapted for detachably coupling with the firearm 10 and an opposed second mounting face 22. The mounting body 20 comprises a mounting structure 23 formed at the first mounting face 21 for detachably coupling with the mounting arrangement 12 of the firearm 10. As shown in FIGS. 1 and 2, the mounting structure 23 comprises two mounting walls 231 upwardly extended along two longitudinal edges of the first mounting face 21 for cooperatively coupling with the mounting arrangement 12 of the firearm 10. The mounting body 20 further comprises a front side 24 and two sidewalls 25 between the first and second mounting faces 21, 22.

The sight module 30 is supported by the mounting body 20 between the first and second mounting faces 21, 22 thereof. According to the preferred embodiment, the sight module 30 comprises an optical unit 31 having a front emitting opening 311 formed at the front side 24 of the mounting body 20 between the first and second mounting faces 21, 22 thereof, and defining an emitting axis 301 at the front emitting opening 311 with respect to the barrel axis 11 of the firearm 10, as shown in FIGS. 1, 3, 4, 7, and 8. In particular, the optical unit 31 is a laser sight arranged for generating a laser beam projected out of front emitting opening 311 along the emitting axis 301, wherein the laser beam is preferably generated parallel to the barrel axis 11 of the firearm 10, such that the laser beam appears a small spot at long distance and spots on a desired target where the barrel axis is aligned.

The sight module 30 further comprises a control switch 32 provided at one of the sidewalls 25 of the mounting body 10 and operatively linked to the optical unit 31 to control the optical unit 31 in an on-and-off manner. Preferably, the control switch 32 is provided at each of the sidewalls 25 of the mounting body 20, such that the user is able to press or touch one of the control switches 32 to switch on the optical unit 31 and to press or touch one of the control switches 32 again to switch off the optical unit 31.

Figure 5:
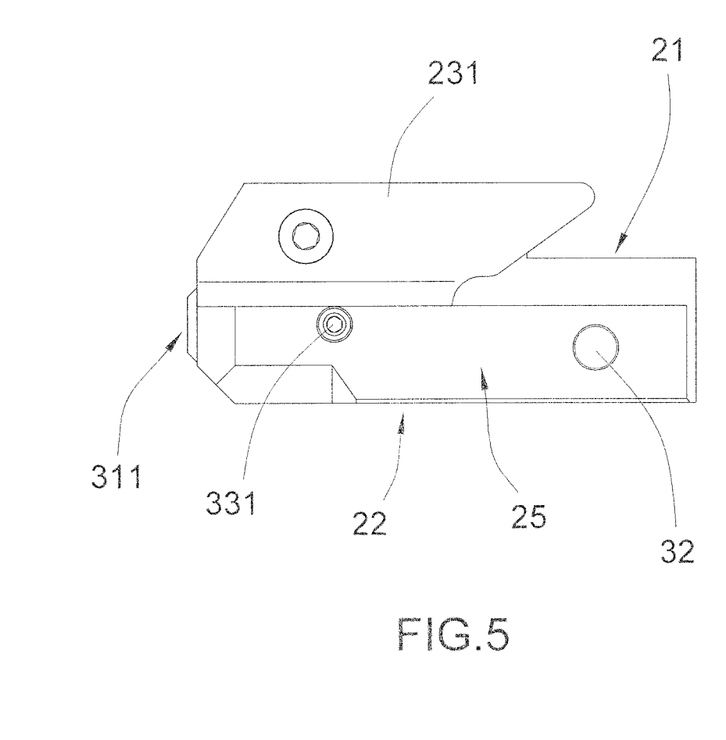
FIG. 5 is a side view of the firearm mount according to the above preferred embodiment of the present invention.
Figure 6:
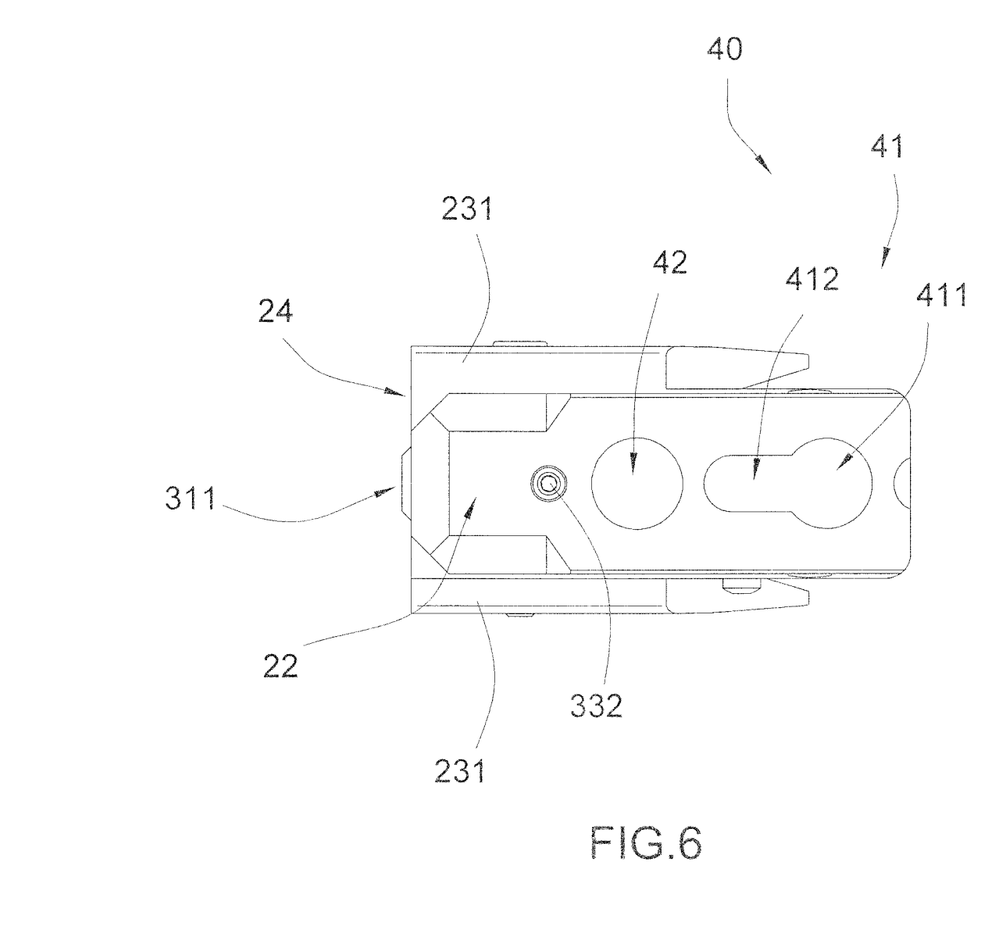
FIG. 6 is a bottom view of the firearm mount according to the above preferred embodiment of the present invention.
Figure 7:
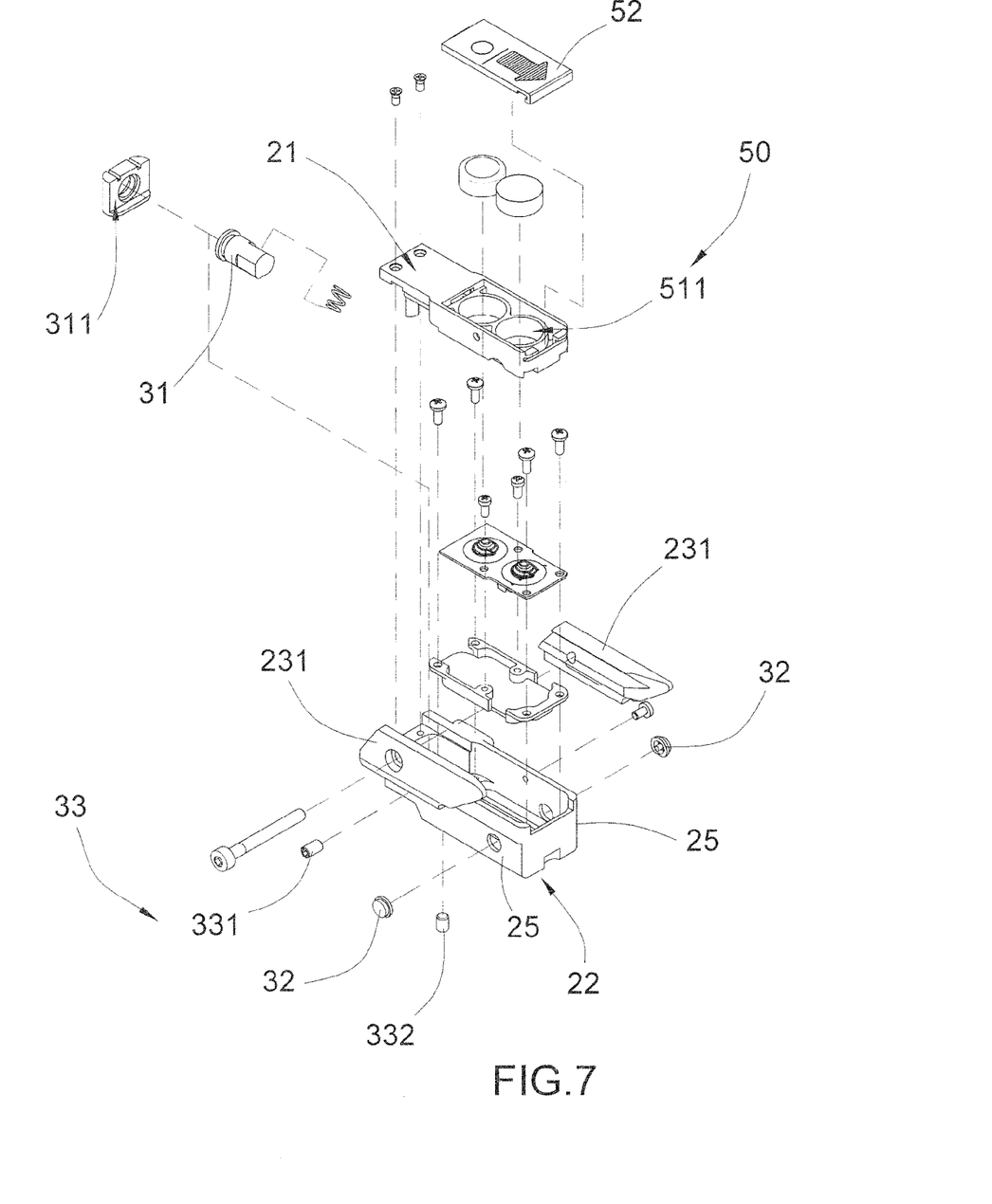
FIG. 7 is an exploded perspective view of the firearm mount according to the above preferred embodiment of the present invention.

In order to ensure the laser beam to be aligned with the barrel axis 11 of the firearm 10, the sight module 30 further comprises an adjustment unit 33 for adjusting the emitting axis 301 of the optical unit 31. The adjustment unit 33 comprises two axis adjustors 331, 332 formed at one of the sidewalls 25 of the mounting body 20 and the second mounting face 22 thereof respectively to calibrate two perpendicular-axle-adjustments of the optical unit 31, as shown in FIGS. 5 to 7. Accordingly, the axis adjustor 331 at the sidewall 25 of the mounting body 20 is arranged to adjust the emitting axis 301 of the optical unit 31 along a X-axis, i.e. the horizontal direction of the optical unit 31. Another axis adjustor 332 at the second mounting face 22 of the mounting body 20 is arranged to adjust the emitting axis 301 of the optical unit 31 along a Y-axis, i.e. the vertical direction of the optical unit 31. The X-axis and Y-axis of the laser sight 31 are perpendicular to the barrel axis 11 of the firearm 10 which is configured to a Z-axis. It should be appreciated that the user is able to selectively adjust the emitting axis 301 of the optical unit 31 to a desired direction, wherein the emitting axis 301 of the optical unit 31 can be adjusted to match with an iron sight at a certain distance, as an example, but not to align with the barrel axis 11 of the firearm 10. In other words, the emitting axis 301 of the optical unit 31 can be adjusted to forwardly project from the firearm 10.

It is appreciated that the sight module 30 can be a navigation light module, wherein the optical unit 31 is a LED defining the front emitting opening 311 formed at the front side 24 of the mounting body 20 between the first and second mounting faces 21, 22 thereof, and an emitting axis 301 at the front emitting opening 311 to project forwardly from the firearm 10. When incorporating with the navigation light module, different colors of navigation light can be provided. Accordingly, the navigation light is a low level LED light that helps the user in low light conditions and provides enough illumination for the user to maneuver and see close objects in dark environments without giving away the user's position to an adversary.

Accordingly, low level white light allows the user to see objects and their natural color the best. Low level blue light is good for hunters to track blood trails. Low level red light is the best color to preserve the user's night vision. Low level green light is another color to help with seeing the environmental and to preserve the user's night vision. In order to change the colors of the navigation light, the user is able to press or touch the control switch 32 to select the desired color of light and to switch the optical unit 31 of the navigation light module on-and-off.

Likewise, the he sight module 30 can also be a flashlight module, wherein the optical unit 31 is a LED defining the front emitting opening 311 formed at the front side 24 of the mounting body 20 between the first and second mounting faces 21, 22 thereof, and an emitting axis 301 at the front emitting opening 311 to project forwardly from the firearm 10. In order to change the light effects of the flashlight module, the user is able to press or touch the control switch 32 to select the desired light effect and to switch the optical unit 31 of the flashlight module on-and-off.

The mounting interface 40 is provided at the second mounting face 22 of the mounting body 20 to define a mounting direction 401 aligning with the barrel axis 11 of the firearm 10. Preferably, the second mounting face 22 of the mounting body 20 is a flat surface that the mounting interface 40 is not outwardly and downwardly protruded from the second mounting face 22 of the mounting body 20.

As shown in FIG. 6, the mounting interface 40 comprises a mounting slot 41 longitudinally formed at the second mounting face 22 of the mounting body 20 and parallel to the barrel axis 11 of the firearm 10. Accordingly, the mounting slot 41 is indented on the second mounting face 22 of the mounting body 20. The mounting slot 41 has an enlarged head portion 411 and an elongated tail portion 412 extended therefrom to form a key-hole configuration. A firearm accessory 13, such as a supporting device, can be detachably coupled at the mounting slot 41, as shown in FIG. 1. Preferably, a coupling head is provided at the firearm accessory 13 that the coupling head is engaged with the enlarged head portion 411 of the mounting slot 41 and is slid to the elongated tail portion 412 thereof at the mounting direction 401 in order to couple the firearm accessory 13 to the second mounting face 22 of the mounting body 20. It is worth mentioning that it is ergonomic for the user to quickly attach the firearm accessory 13 to the second mounting face 22 of the mounting body 20 via the mounting interface 40 at the mounting direction 401 when the user holds the firearm 10 because the mounting direction 401 is parallel to the barrel axis 11 of the firearm 10, as shown in FIG. 1. If the mounting direction 401 is transverse to the barrel axis 11 of the firearm 10, the firearm 10 will be swung left and right during the mounting operation. Therefore, by configuring the mounting direction 401 parallel to the barrel axis 11 of the firearm 10, the firearm 10 will be held straight during the mounting operation. In other words, the user will have a better control of the firearm 10 to maneuver the direction of the barrel of the firearm.

Figure 3:
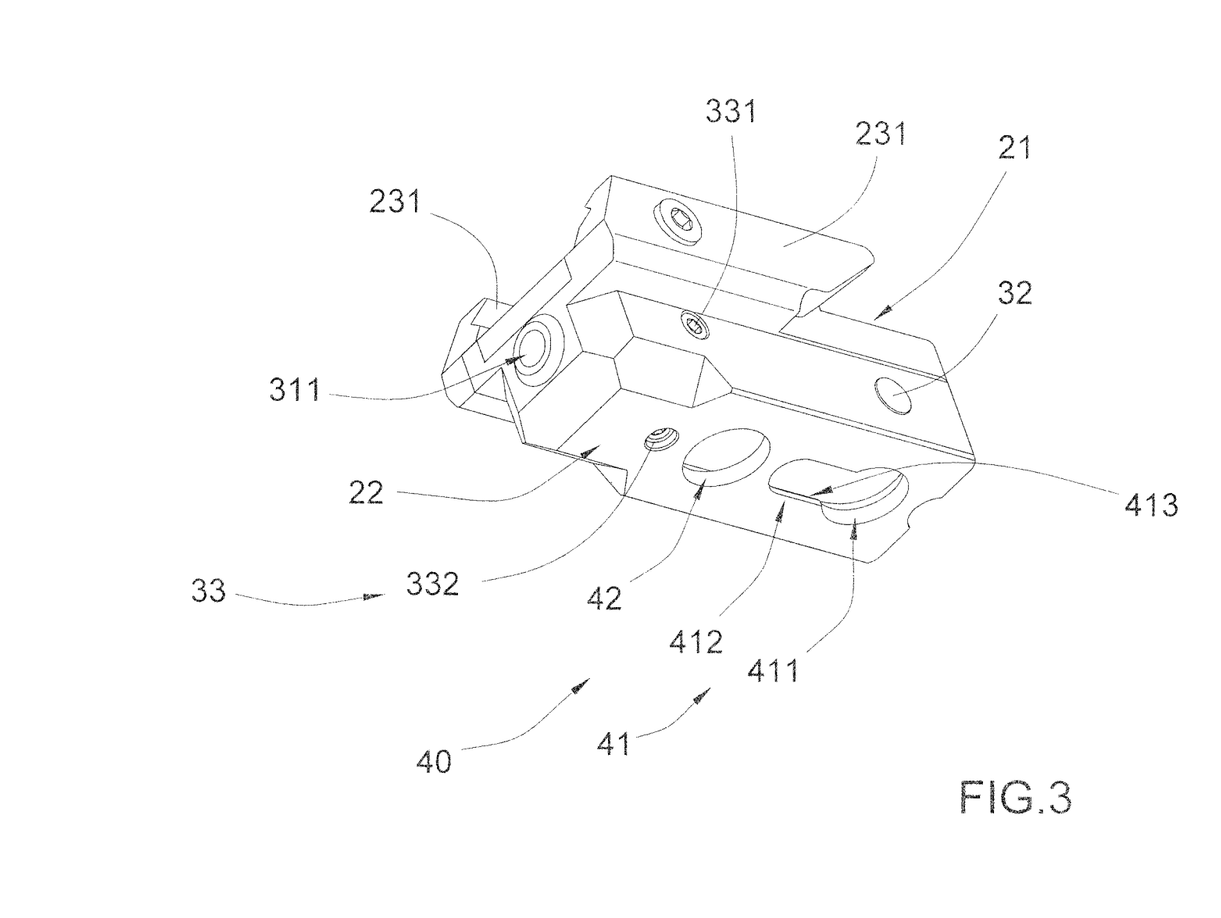
FIG. 3 is a bottom perspective view of the firearm mount according to the above preferred embodiment of the present invention.
Figure 4:
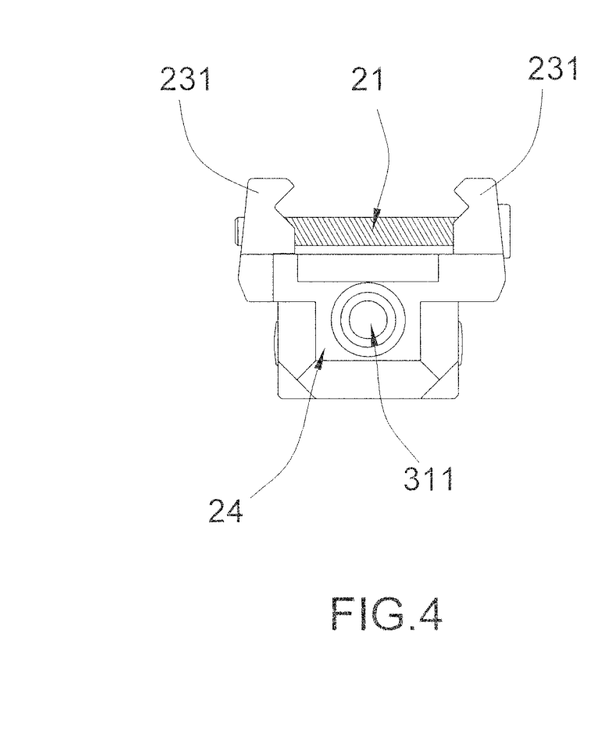
FIG. 4 is a front view of the firearm mount according to the above preferred embodiment of the present invention.
Figure 8:
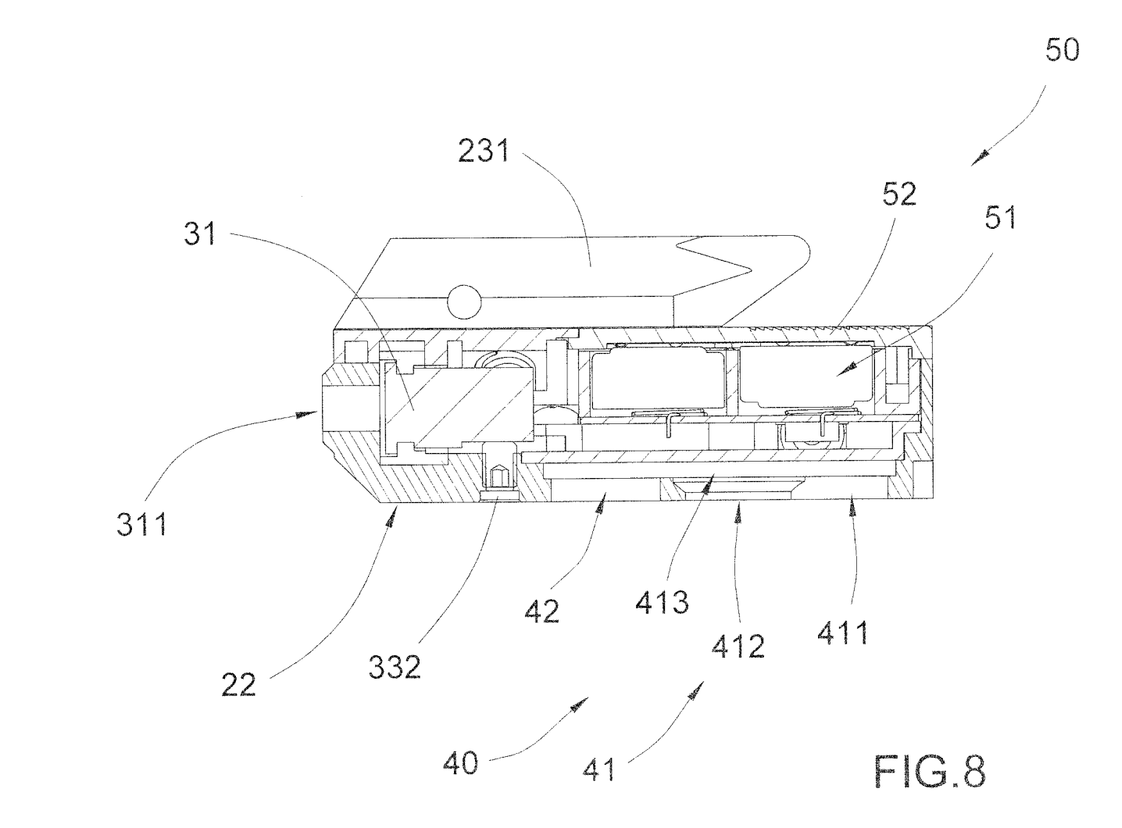
FIG. 8 is a sectional view of the firearm mount according to the above preferred embodiment of the present invention.

As shown in FIGS. 3 and 8, the mounting slot 41 further has an internal channel 413 formed along the elongated tail portion 412 of the mounting slot 41, wherein the internal channel 413 is located above and parallel to the second mounting face 22 of the mounting body 20. An opening area of the elongated tail portion 412 at the second mounting face 22 of the mounting body 22 is larger than a size of the internal channel 413. Therefore, the coupling head can be disposed at the enlarged head portion 411 of the mounting slot 41 and can be slid to the elongated tail portion 412 at the internal channel 413 to engage the coupling head with the mounting slot 41.

The mounting interface 40 further comprises an alignment slot 42 formed at the second mounting face 22 of the mounting body 22 to align with the mounting slot 41. Accordingly, the mounting slot 41 and the alignment slot 42 are aligned at the mounting direction 401. In particular, centerlines of the mounting slot 41 and the alignment slot 42 are aligned at the mounting direction 401, wherein the elongated tail portion 412 of the mounting slot 41 is located between the enlarged head portion 411 of the mounting slot 41 and the alignment slot 42. Preferably, the size of the enlarged head portion 411 of the mounting slot 41 matches with the size of the alignment slot 42.

According to the preferred embodiment, the mounting interface 40 is a "KeyMod" interface that the mounting slot 41 is a "KeyMod" slot formed at the second mounting face 22 of the mounting body 20. Therefore, the firearm accessory 13 having a "KeyMod" nut will serve as the coupling head to detachably couple with the mounting slot 41 at the mounting direction 401. It is worth mentioning that the firearm accessory 13 can be detached from the second mounting face 22 of the mounting body 20 at a dismounting direction which is opposite to the mounting direction 401. The mounting direction 401 and the dismounting direction are parallel to the barrel axis 11 of the firearm 10.

It is worth mentioning that when the mounting interface 40 is incorporated with the second mounting face 22 of the mounting body 20, the mounting body 20 serves as an adapter to convert the conventional mounting structure into another mounting structure. In other words, the adapter can convert the "Weaver" mounting rail or the "Picatinny" mounting rail into the "KeyMod" interface.

As shown in FIGS. 2, 7, and 8, the firearm mount further comprises a power module 50 operatively linked to the sight module 30. The power module 50 comprises a battery compartment 51 formed at the mounting body 20 and defined a compartment opening 511 at the first mounting face 21 of the mounting body 20, wherein at least a battery is replaceably disposed in the battery compartment 51 to operatively link to the sight module 30.

The power module 50 further comprises a compartment cover 52 detachably coupled on the first mounting face 21 of the mounting body 20 at the compartment opening 511 to enclose the battery compartment 51, wherein the compartment cover 52 is located between the two mounting walls 231. Accordingly, the compartment cover 52 is hidden when the mounting body 20 is coupled at the firearm 10. In particular, when the mounting body 20 is coupled at the firearm 10, the compartment cover 52 is sandwiched between the mounting body 20 and the firearm 10. Therefore, the compartment cover 52 cannot be accessed once the mounting body 20 is coupled at the firearm 10. It is worth mentioning that if the compartment cover 52 is provided at the second mounting face 22 of the mounting body 20, the compartment cover 52 will be exposed for being accessed. As a result, the compartment cover 52 may accidentally detach from the mounting body 20 by any external force. In addition, the compartment cover 52 will utilize the area of the second mounting face 22 of the mounting body 20, such that the second mounting face 22 of the mounting body 20 may only provide a limited space to incorporate with the mounting interface 40. Therefore, the compartment cover 52 should be provided at the first mounting face 21 of the mounting body 20 and should be hidden to prevent any access once the mounting body 20 is coupled at the firearm 10.

Figure 9:
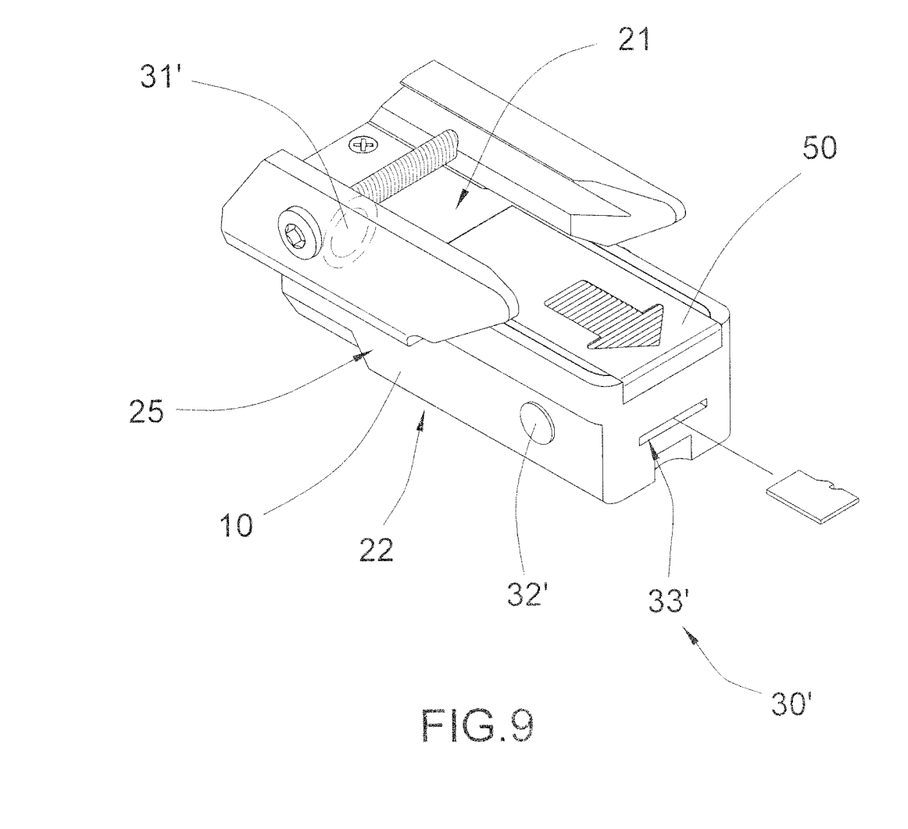
FIG. 9 illustrates an alternative view of the sight module of the firearm mount according to the above preferred embodiment of the present invention.

FIG. 9 illustrates an alternative mode of the sight module 30' which is embodied as a camera module, wherein the optical unit 31' is a camera unit for capturing images in front of the firearm 10. Accordingly, the sight module 30' further comprises a memory module having a memory slot 33' formed at a rear side of the mounting body 10, wherein an external memory, such as a micro SD (secure digital) card, can be inserted into the memory slot 33' to save and store the images captured by the optical unit 31' (camera unit). The control switch 32' is arranged to control the optical unit 31' in an on-and-off manner. It is important that the capturing view of the optical unit 31 is aligned with the barrel axis of the firearm 10, such that the images captured by the optical unit 31 will show the target where the barrel is pointed. Therefore, the user is able to remove the external memory from the memory slot 33' and view the images to track the pointing direction of the firearm 10.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A firearm mount for a firearm defining a barrel axis, comprising:
   a mounting body having a first mounting face adapted for detachably coupling with said firearm and an opposed second mounting face;
   a sight module supported by said mounting body between said first and second mounting faces thereof; and
   a mounting interface provided at said second mounting face of said mounting body, wherein said mounting interface comprises a mounting slot defining a mounting direction parallel to the barrel axis, wherein said mounting slot has an enlarged head portion, an elongated tail portion extended therefrom to form a keyhole configuration, and an internal channel which is formed along said elongated tail portion and is located above and parallel to said second mounting face of said mounting body.

2. The firearm mount, as recited in claim 1, wherein an opening area of said elongated tail portion is larger than a size of said internal channel.

3. The firearm mount, as recited in claim 2, wherein said mounting body further comprises a mounting structure formed at said first mounting surface, wherein said mounting structure comprises two mounting walls upwardly extended along two longitudinal edges of said first mounting face for coupling with a bottom side of a barrel of the firearm.

4. The firearm mount, as recited in claim 2, wherein said mounting interface further comprises an alignment slot formed at said second mounting face of said mounting body to align with said mounting slot, wherein said elongated tail portion of said mounting slot is located between said enlarged head portion of said mounting slot and said alignment slot.

5. The firearm mount, as recited in claim 1, further comprising a power module operatively linked to said sight module, wherein said power module comprises a battery compartment formed at said mounting body and a compartment cover detachably coupled at said first mounting face of said mounting body to enclose said battery compartment, such that said compartment cover is hidden and sandwiched between said mounting body and said firearm when said mounting body is coupled at said firearm.

6. The firearm mount, as recited in claim 3, further comprising a power module operatively linked to said sight module, wherein said power module comprises a battery compartment formed at said mounting body and a compartment cover detachably coupled at said first mounting face of said mounting body to enclose said battery compartment, such that said compartment cover is hidden and sandwiched between said mounting body and said firearm when said mounting body is coupled at said firearm.

7. The firearm mount, as recited in claim 4, further comprising a power module operatively linked to said sight module, wherein said power module comprises a battery compartment formed at said mounting body and a compartment cover detachably coupled at said first mounting face of said mounting body to enclose said battery compartment, such that said compartment cover is hidden and sandwiched between said mounting body and said firearm when said mounting body is coupled at said firearm.

8. The firearm mount, as recited in claim 1, wherein said sight module comprises a laser sight having a front emitting opening formed at a front side of said mounting body between said first and second mounting faces thereof, and defining an emitting axis at said front emitting opening with respect to said barrel axis of said firearm.

9. The firearm mount, as recited in claim 6, wherein said sight module comprises a laser sight having a front emitting opening formed at a front side of said mounting body between said first and second mounting faces thereof, and defining an emitting axis at said front emitting opening with respect to said barrel axis of said firearm.

10. The firearm mount, as recited in claim 7, wherein said sight module comprises a laser sight having a front emitting opening formed at a front side of said mounting body between said first and second mounting faces thereof, and defining an emitting axis at said front emitting opening with respect to said barrel axis of said firearm.

11. The firearm mount, as recited in claim 8, wherein said sight module further comprises an adjustment unit for adjusting said emitting axis of said laser sight to align with said barrel axis of said firearm, wherein said adjustment unit comprises two axis adjustors formed at a sidewall of said mounting body and said second mounting face thereof respectively to calibrate two perpendicular-axle-adjustments of said laser sight.

12. The firearm mount, as recited in claim 9, wherein said sight module further comprises an adjustment unit for adjusting said emitting axis of said laser sight to align with said barrel axis of said firearm, wherein said adjustment unit comprises two axis adjustors formed at a sidewall of said mounting body and said second mounting face thereof respectively to calibrate two perpendicular-axle-adjustments of said laser sight.

13. The firearm mount, as recited in claim 10, wherein said sight module further comprises an adjustment unit for adjusting said emitting axis of said laser sight to align with said barrel axis of said firearm, wherein said adjustment unit comprises two axis adjustors formed at a sidewall of said mounting body and said second mounting face thereof respectively to calibrate two perpendicular-axle-adjustments of said laser sight.

14. The firearm mount, as recited in claim 1, wherein said sight module is formed at a front side of said mounting body between said first and second mounting faces thereof and is selected from a group consisting of navigation light module, flashlight module, and camera module.

15. The firearm mount, as recited in claim 12, wherein said sight module is formed at a front side of said mounting body between said first and second mounting faces thereof and is selected from a group consisting of navigation light module, flashlight module, and camera module.

16. The firearm mount, as recited in claim 13, wherein said sight module is formed at a front side of said mounting body between said first and second mounting faces thereof and is selected from a group consisting of navigation light module, flashlight module, and camera module.

17. A firearm mount for a firearm, comprising:
a mounting body having a first mounting face and an opposed second mounting face, wherein said mounting body comprises a mounting structure formed at said first mounting surface, wherein said mounting structure comprises two mounting walls upwardly extended along two longitudinal edges of said first mounting face for coupling with a bottom side of a barrel of the firearm;
a sight module supported by said mounting body between said first and second mounting faces thereof;
a mounting interface provided at said second mounting face of said mounting body; and
a power module operatively linked to said sight module, wherein said power module comprises a battery compartment formed at said mounting body and defined a compartment opening at said first mounting face between said mounting walls, and a compartment cover detachably coupled on said first mounting face of said mounting body at said compartment opening to enclose said battery compartment, such that said compartment cover is hidden and sandwiched between said mounting body and said firearm when said mounting body is coupled at said firearm.

18. The firearm mount, as recited in claim 17, wherein said mounting interface comprises a mounting slot having an enlarged head portion, an elongated tail portion extended therefrom to form a key-hole configuration, and an internal channel which is formed along said elongated tail portion and is located above and parallel to said second mounting face of said mounting body.

19. The firearm mount, as recited in claim 17, wherein said sight module is formed at a front side of said mounting body between said first and second mounting faces thereof and is selected from a group consisting of laser sight, navigation light module, flashlight module, and camera module.

20. The firearm mount, as recited in claim 18, wherein said sight module is formed at a front side of said mounting body between said first and second mounting faces thereof and is selected from a group consisting of laser sight, navigation light module, flashlight module, and camera module.

21. A firearm mount for a firearm having a mounting arrangement and defining a barrel axis, comprising:
a mounting body having a first mounting face and an opposed second mounting face, wherein said mounting body comprises a mounting structure formed at said first mounting surface, wherein said mounting structure comprises two mounting walls upwardly extended along two longitudinal edges of said first mounting face for coupling with a bottom side of a barrel of the firearm; and
a mounting interface provided at said second mounting face of said mounting body, wherein said mounting interface comprises a mounting slot defining a mounting direction parallel to the barrel axis of the firearm, wherein said mounting body with said mounting interface serves as an adapter for a firearm accessory having a coupling head detachably coupling at said mounting slot.

22. The firearm mount, as recited in claim 21, wherein said mounting slot has an enlarged head portion, an elongated tail portion extended therefrom to form a key-hole configuration, and an internal channel which is formed along said elongated tail portion and is located above and parallel to said second mounting face of said mounting body.

23. The firearm mount, as recited in claim 22, wherein an opening area of said elongated tail portion is larger than a size of said internal channel.

\* \* \* \* \*